United States Patent [19]

Streeter

[11] 4,116,317
[45] Sep. 26, 1978

[54] FLUID COUPLING DEVICE WITH IMPROVED DISENGAGED OPERATING CHARACTERISTICS

[75] Inventor: Kenneth R. Streeter, Marshall, Mich.

[73] Assignee: Eaton Corporation, Cleveland, Ohio

[21] Appl. No.: 764,772

[22] Filed: Feb. 2, 1977

[51] Int. Cl.² .................... F16D 31/08; F16D 33/20
[52] U.S. Cl. .................................................. 192/58 B
[58] Field of Search .................. 192/58 R, 58 A, 58 B

[56] References Cited

U.S. PATENT DOCUMENTS

| | | | |
|---|---|---|---|
| 3,809,197 | 5/1974 | Clancey | 192/58 B |
| 3,949,849 | 4/1976 | Hammer | 192/58 B |
| 3,990,556 | 11/1976 | Hayashi et al. | 192/58 B |

*Primary Examiner*—Roy Lake
*Assistant Examiner*—E. F. Desmond
*Attorney, Agent, or Firm*—Leslie J. Kasper

[57] ABSTRACT

A fluid coupling device, especially a viscous fan drive, of the type including an output coupling member defining a fluid operating chamber and an annular inner surface. The device includes an input coupling member rotatably disposed in the operating chamber and cooperating with the output member to define a shear space. The input coupling member defines an annular outer surface including a generally cylindrical surface portion adjacent the forward surface of the input member and closely spaced apart from the inner surface of the output member. The outer surface of the input member also includes a second surface portion which is generally frusto-conical and cooperates with the axis of rotation to define an included angle between about 25 degrees and about 35 degrees. The invention results in a coupling having lower disengaged output speeds as well as reduced disengagement time during cold-start-up, without weakening of the outer periphery of the input member.

11 Claims, 6 Drawing Figures

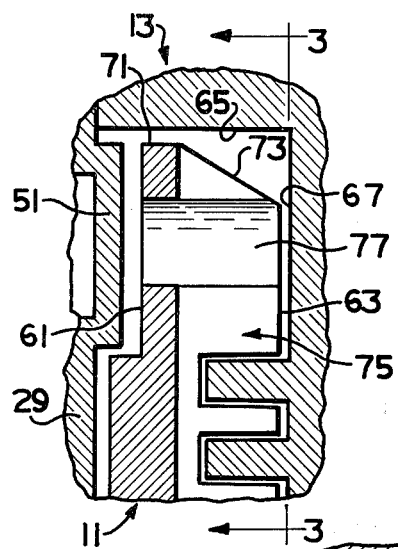
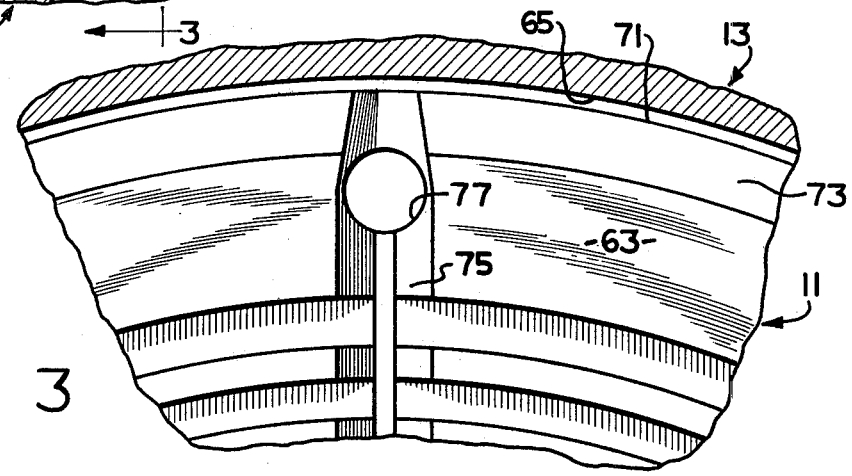
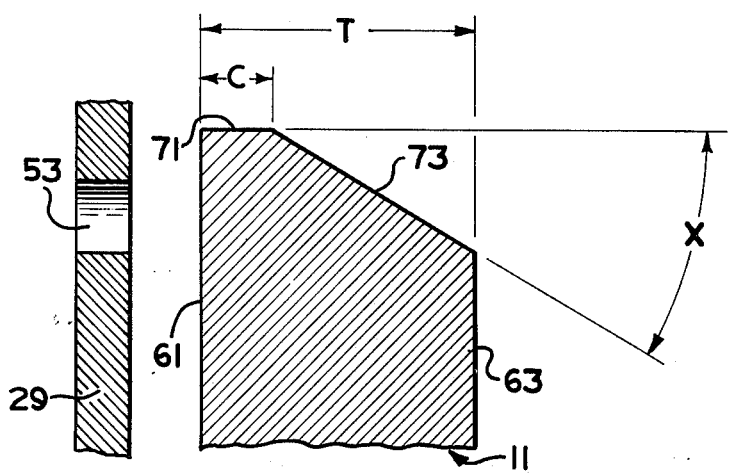

FLUID COUPLING DEVICE WITH IMPROVED DISENGAGED OPERATING CHARACTERISTICS

BACKGROUND OF THE DISCLOSURE

The present invention relates to torque transmitting fluid couplings, and more particularly, to such couplings which utilize internal valving, whereby the fluid coupling may be in either an engaged or disengaged condition, depending upon the position of the valving.

Fluid couplings of the type to which the present invention relates are well known in the art and may be better understood by reference to U.S. Pat. Nos. 3,055,473; 3,174,600; and 3,339,689, all of which are assigned to the assignee of the present invention. Briefly, such fluid couplings typically include an output coupling member and a cover which cooperate to define a fluid chamber, a valve plate dividing the fluid chamber into an operating chamber and a reservoir chamber, and an input coupling member disposed within the operating chamber and rotatable relative to the output coupling member. The input and output coupling members define a shear space such that rotation of the input member causes viscous fluid in the shear space to exert a viscous drag on the output member, causing it to rotate. The valve plate defines a fill orifice, and a valving arrangement controls the flow of fluid from the reservoir chamber, through the fill orifice, into the operating chamber. Typically, the valving is temperature-responsive, as is illustrated in the above-cited patents, such that below a certain ambient temperature, the valving is closed, most of the viscous fluid is discharged from the operating chamber to the reservoir chamber and the fluid coupling is considered to be "disengaged". Above the predetermined temperature, the valving gradually opens and viscous fluid is permitted to flow from the reservoir into the operating chamber, filling the shear space, such that the coupling is "engaged".

Conventional fluid couplings of the type to which the present invention relates have been provided with relatively small clearances between the outer periphery of the input member and the inner periphery of the output member, partly because the viscous fluid between these adjacent peripheries acts as a fluid bearing, and partly to maximize the available shear surface and the torque transmitting capacity. Therefore, although the present invention may be utilized in fluid coupling devices of many different embodiments, it is especially useful in those in which the outer periphery of the input member and the inner periphery of the output member are closely spaced apart. It is also especially useful in those in which some form of valving is provided to control the flow of fluid into the operating chamber, such that the coupling may be utilized in either an engaged or a disengaged condition.

Conventional fluid couplings have been of the type referred to as "full OD", i.e., the outer periphery of the input member is cylindrical and has a maximum diameter over the entire axial extent of the outer periphery. As noted previously, a full OD input member provides maximum torque transmission when the fluid coupling is engaged. With the coupling disengaged, however, several problems arise in connection with the use of the full OD input member. One of these is the "cold-start" condition which arises after the coupling has been inoperative for a period of time and fluid has leaked from the reservoir into the operating chamber, causing the coupling to operate as though it were engaged when it is supposed to be disengaged. Upon start-up of the coupling under this condition, it typically takes several minutes for enough of the fluid to be discharged from the operating chamber back into the reservoir chamber to reduce the speed of the output member to its normal, disengaged level. During this period of time, operation of the coupling is normally not desired, e.g., the coupling is driving the radiator cooling fan of a vehicle engine and no cooling is required upon initial start-up of the vehicle engine. Moreover, the continued, engaged operation of the coupling for a period of several minutes, typically at speeds well above 1,000 rpm, results in an objectionable noise level, especially when the engine is warming up at fast idle.

A related problem is the output speed level of the coupling in the disengaged condition. A relatively higher disengaged output speed results in a relatively higher horsepower consumption by the coupling and the associated cooling fan with no resultant benefit. Finally, the problem of acceleration overshoot is common in fluid couplings of this type. Acceleration overshoot occurs as the input speed rises from a low level and the output speed temporarily rises well above the normal disengaged speed level before dropping down again to the normal level.

In an attempt to overcome the problems associated with a full OD input member, those working in the art have developed and commercialized a "stepped OD" input member, a general example of which is illustrated in U.S. Pat. No. 3,613,847. The assignee of the present invention has commercialized a coupling having a stepped OD input member, but with the step adjacent the forward surface of the input member, rather than adjacent the rearward surface as in the cited patent. Although the stepped OD input member overcomes certain disadvantages of the full OD configuration, its use introduces certain additional problems. The step (typically, 0.050 inches wide × 0.050 inches high) is susceptible to damage if subjected to normal handling during manufacture, or conversely, requires special handling during manufacture to avoid damage to the step. In addition, if it is desired to further improve the disengaged operating characteristics (i.e., reduce cold-start time, reduce disengaged speed level, and reduce acceleration overshoot), it is necessary to increase the height of the step (i.e., reduce the diameter of the input member adjacent the step). However, increasing the height of the step further weakens the outer periphery of the input member and changes its ability to withstand handling, or changes the handling procedures required to avoid damage.

SUMMARY OF THE INVENTION

Accordingly, it is an object of the present invention to provide a fluid coupling device in which the input member is configured to overcome the problems associated with the use of a full OD input member, without introducing the disadvantages associated with a stepped OD input member.

It is a related object of the present invention to provide a fluid coupling device in which the input member has a configuration whereby it is possible to vary the disengaged operating characteristics versus the engaged operating characteristics independent of, and without affecting the strength and/or rigidity of the peripheral portion of the input coupling member.

It is another object of the present invention to improve the disengaged operating characteristics of a fluid coupling device of the type in which the input coupling member defines a plurality of radial channels by permitting the radial channels to intersect the outer periphery of the input member.

The above and other objects of the invention are accomplished by the provision of an improved fluid coupling device including a first rotatable member, cover means associated with the first member to define a fluid chamber, a valve plate disposed to separate the fluid chamber into an operating chamber and a reservoir chamber, and a second rotatable member disposed in the operating chamber. The second member has first and second wall surfaces perpendicular to the axis of rotation to define a thickness T therebetween. The second wall surface and an adjacent surface of the first member define a shear space. Valve means is associated with the valve plate to control the flow of fluid from the reservoir chamber into the operating chamber and temperature-responsive means is associated with the valve means to affect the operation of the valve means in response to variations in a predetermined temperature condition. The second member defines a generally annular outer surface and the first member defines a generally annular inner surface. The outer surface includes a first surface portion disposed adjacent the first wall surface, the first surface portion being cylindrical and closely spaced apart from the inner surface, and extending axially a distance less than about T/3. The outer surface further includes a second surface portion contiguous with the first surface portion and extending to the second wall surface, the second surface portion being generally frusto-conical and cooperating with the axis of rotation to define an included angle between about 15° and about 45°.

BRIEF DESCRIPTION OF THE DRAWINGS

FIG. 2 is an enlarged, fragmentary view, similar to FIG. 1, but on a different plane.

FIG. 3 is a transverse plan view of the input coupling member, taken on line 3—3 of FIG. 2, and on the same scale as FIG. 2.

FIG. 4 is a further enlarged, fragmentary view showing only the input coupling member and the valve plate, on a different plane than either FIG. 1 or FIG. 2.

DESCRIPTION OF THE PREFERRED EMBODIMENT

Figure 1:
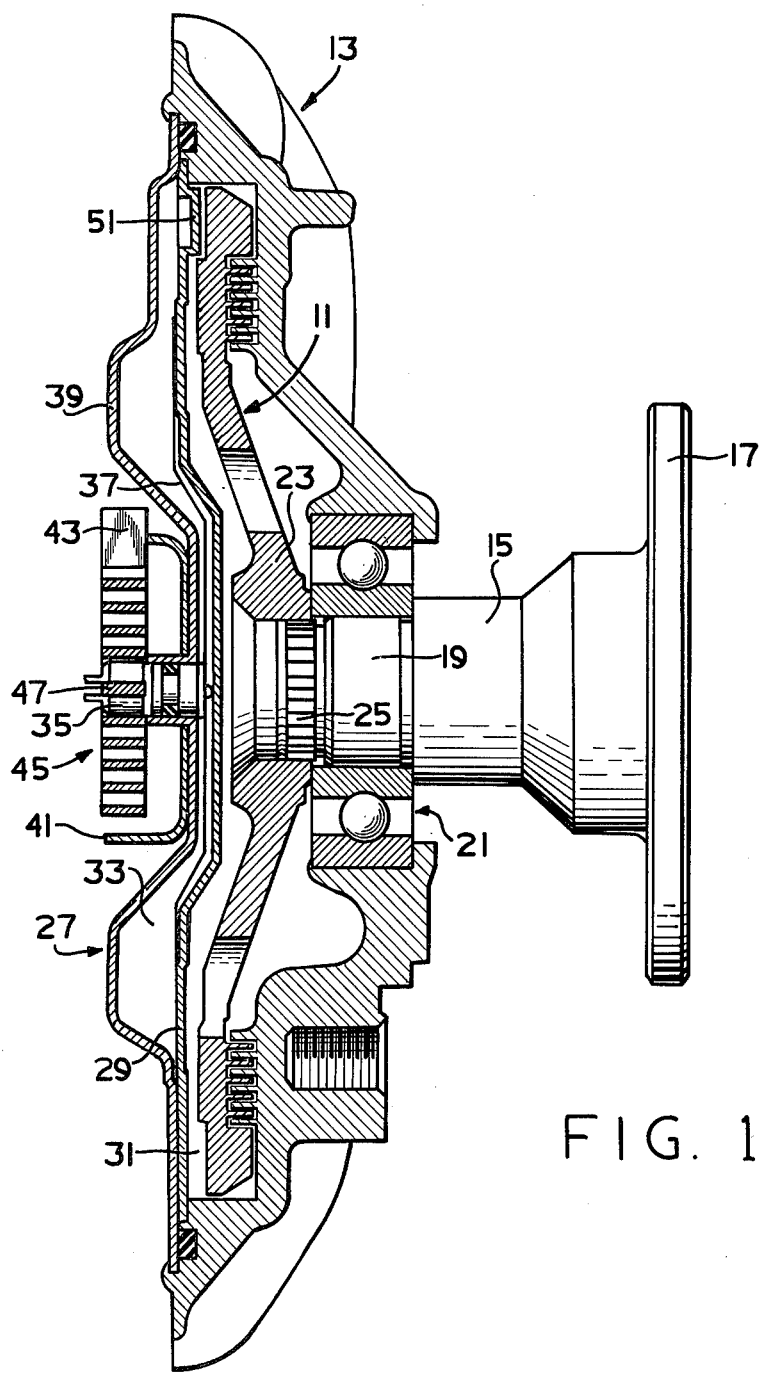
FIG. 1 is an axial cross section of a typical fluid coupling device of the type with which the present invention may be utilized.

Referring now to the drawings, which are not intended to limit the present invention, FIG. 1 illustrates the preferred form of a fluid coupling device with which the present invention may be utilized. The fluid coupling device includes an input coupling member 11 and an output coupling member 13. The fluid coupling is shown herein as a drive for an automotive engine accessory, and specifically, as a drive for a radiator cooling fan. It will be understood, however, that the use of the present invention is not limited to any particular fluid coupling configuration or application.

The fluid coupling includes an input shaft 15 on which input member 11 is mounted and which is rotatably driven, such as by means of a flange 17 which, in the subject embodiment, may be bolted to the water pump flange (not shown). The input shaft 15 has a reduced shaft portion 19 intermediate its ends, and functioning as a support for the inner race of a bearing set 21 which is seated on the inside diameter of the output coupling member 13.

The input coupling member 11 is in the form of a disc having a hub portion 23 supported by the forward end of the shaft 15. The hub portion 23 has an opening therethrough which has an interference fit with a serrated portion 25 of the shaft 15. The hub portion 23 is pressed onto the shaft 15 until it abuts the side of the inner race of the bearing set 21, and the output end (left end in FIG. 1) of the shaft 15 is balled over to positively retain the input coupling member 11 on the shaft, such that rotation of the shaft 15 causes rotation of the input coupling member 11.

The output coupling member 13 cooperates with a cover assembly, generally designated 27, to define a fluid chamber therebetween, the fluid chamber being separated by a valve plate 29 into a fluid operating chamber 31 and a fluid reservoir chamber 33. Rotatably supported by the cover assembly 27 is a valve shaft 35 having attached to its inner end (right end in FIG. 1), a valve arm 37, the general construction and operation of which may be better understood by reference to the above-mentioned U.S. Pat. No. 3,055,473. The cover assembly 27 includes a cover member 39 which, in the subject embodiment, is a single piece metal stamping. Attached, as by welding, to the outer surface of the cover member 39 is a bracket member 41 which supports an outer end 43 of a bimetal coil, generally designated 45, with an inner end 47 thereof which is positioned in a slot formed in the outer end of the of the valve shaft 35.

It should be understood that the scope of the present invention is not limited to any particular configuration of valving to control the flow of fluid from the fluid reservoir chamber 33 into the fluid operating chamber 31. Nor is the invention limited to any particular type of temperature-responsive means to control the valving, it being necessary only that the valving be controlled in response to a predetermined condition to cause the coupling to be either engaged or disengaged.

Referring now to FIGS. 2, 3, and 4, in conjunction with FIG. 1, it may be seen that the stamped valve plate 29 includes a wiper portion 51, which may be formed during the stamping of the valve plate 29, or may comprise a member welded to the valve plate subsequent to stamping. The wiper portion 51 (best seen in FIG. 2) operates in a manner well known in the art to generate a region of increased fluid pressure adjacent the trailing edge of the wiper portion 51, because the input member 11 and the fluid contained in the operating chamber 31 are rotating at a faster speed than is the output member 13. Adjacent the trailing edge of the wiper portion 51, the valve plate 29 defines a discharge orifice 53, whereby the increased fluid pressure within the operating chamber 31 causes a flow of fluid through the discharge orifice 53 into the reservoir chamber 33. It should be noted that fluid is discharged or evacuated from the operating chamber 31 to the reservoir chamber 33 in the manner described above whether the fluid coupling is engaged or disengaged.

Referring now primarily to FIG. 2, the input member 11 defines a forward wall surface 61 disposed adjacent the valve plate 29, and a rearward wall surface 63. The output member 13 defines an annular inner surface 65, serving as the boundary of the fluid operating chamber 31. The output member 13 also includes a wall surface 67 which is closely spaced apart from the rearward wall surface 63 such that the surfaces 67 and 63 define a shear space. In the preferred embodiment, the surfaces 63 and 67 cooperate to define a plurality of concentric, circumferentially-extending, interdigitated lands and grooves to maximize the available shear area and the torque transmitting capacity of the coupling, as is well known in the art.

Adjacent the forward wall surface 61 the input member 11 defines a generally cylindrical surface portion 71, and contiguous with the surface portion 71 and extending to the rearward wall surface 63, the input member 11 defines a frusto-conical surface portion 73.

Figure 5:
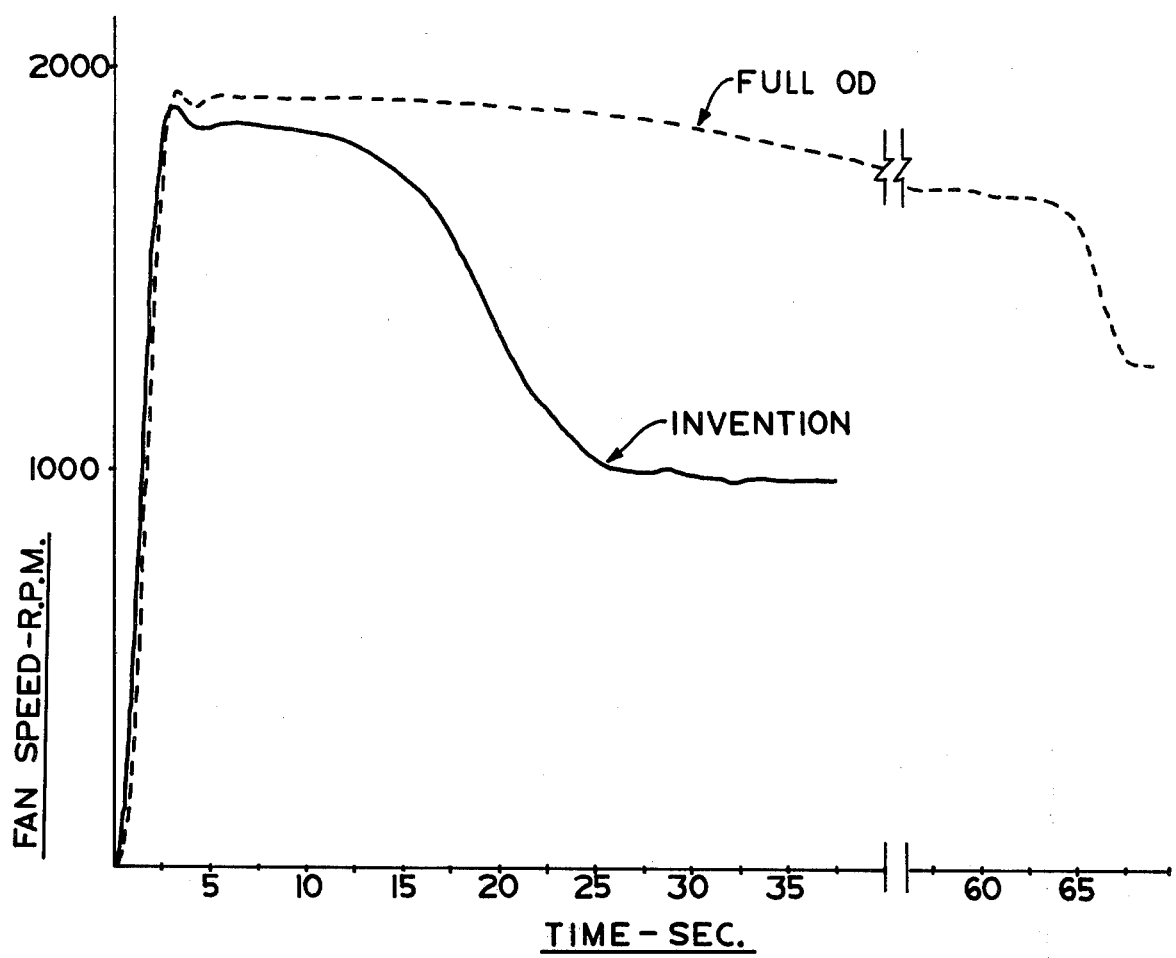
FIG. 5 is a graph of fan speed versus time, illustrating the cold-start condition.
Figure 6:
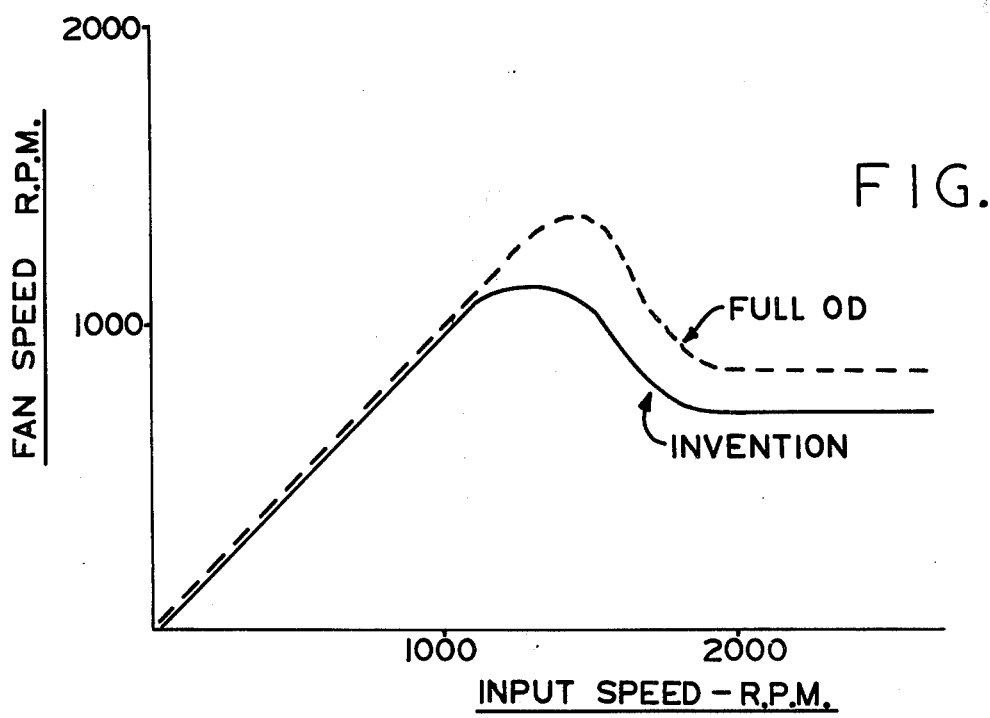
FIG. 6 is a graph of fan speed versus input speed, illustrating the problems of acceleration overshoot and disengaged fan speed.

Referring now primarily to FIG. 4, it may be seen that the forward and rearward surfaces 61 and 63 define a thickness T therebetween and the cylindrical surface portion 71 has a width (or axial extent) labeled "C". In evaluating prototype samples of the present invention, it has been found that dimension C should be less than about one-third of thickness T in order to overcome the disadvantages of the conventional full OD configuration as discussed extensively hereinabove (see the graphs of FIGS. 5 and 6). Preferably, the dimension C should be between about one-fifth of T and one-fourth of T, the minimum being significant because of the fluid bearing action between the surface portion 71 and the surface 65, as described previously.

The frusto-conical surface portion 73 defines an included angle with respect to the axis of rotation of the coupling, the included angle being illustrated in FIG. 4 as the angle "X" with respect to the surface portion 71, for ease of illustration, on the assumption that the surface portion 71 and the axis of rotation are substantially parallel. It is a feature of the present invention that the included angle defined by the surface portion 73 may be adjusted or varied to achieve a balance between the disengaged operating characteristics and the engaged operating characteristics. It is believed that in order to achieve the advantages of the present invention, the angle X should be between 15° and 45°. If the angle X is 15°, some improvement in disengaged operating characteristics will occur. For example, disengaged output speed will be relatively lower while cold-start evacuation or disengagement time will be reduced and acceleration overshoot will be reduced. At the same time, only a very slight decrease in engaged operation characteristics will occur, for example, peak engaged speed will be reduced very slightly. If we would now increase the angle X to 45°, a substantial further improvement in the disengaged operating characteristics would occur, but at the same time, it is likely that the decrease in the engaged operating characteristics would become noticeable, possibly to the extent of being objectionable. Accordingly, in the preferred embodiment of the invention, the angle X is between about 25° and about 35°, and in a commercial embodiment of the invention, the angle X is 32°.

It should be appreciated that although the frusto-conical surface portion 73 is shown in FIGS. 1, 2, and 4 as being linear, it is within the scope of the invention for the surface 73 to vary somewhat from a linear configuration. For example, the surface portion 73 could define a compound angle, i.e., comprise two surface portions, each defining a different included angle relative to the axis of rotation. Also, the surface portion 73 could appear in cross section as slightly curvilinear. The essential feature in regard to the surface portion 73 is that it have an overall frusto-conical configuration. It should also be noted that within the scope of the present invention, the input member 11 may have the conventional full OD configuration while the adjacent annular inner surface 65 could comprise a cylindrical portion and a frusto-conical portion, resulting in the equivalent shape of clearance between the peripheries of the input member 11 and output member 13 as is shown in FIG. 2 in connection with the preferred embodiment.

Referring now primarily to FIG. 3, in conjunction with FIG. 2, the input member 11 defines a plurality of radially-extending channels 75, each of the channels 75 being generally V shaped in cross section. It has been known in the prior art to provide the input member with such radially-extending channels in order to evacuate fluid from the land and groove area, but it has been conventional practice for the channels to dead end radially inward from the outer periphery of the input member. Evacuation of fluid from the channel is then typically accomplished by means of a hole through the input member such as hole 77 communicating between the channel 75 and the forward wall surface 61. In the present invention, in addition to the hole 77, evacuation of fluid from the land and groove area is accomplished by extending the channels 75 a sufficient distance such that they intersect the frusto-conical surface portion 73, thus minimizing the buildup of pressure within the channel 75. This intersection of the channels 75 and surface portion 73, and the resulting rapid evacuation of fluid from the land and groove area is believed to be partly responsible for the reduced disengagement time upon cold-start-up, as well as the reduction in acceleration overshoot.

I claim:
1. A fluid coupling device comprising:
   (a) a first rotatable member;
   (b) cover means associated with said first member to define a fluid chamber therebetween;
   (c) a valve plate disposed to separate said fluid chamber into a fluid operating chamber and a fluid reservoir chamber;
   (d) a second rotatable member disposed in said fluid operating chamber and being rotatable relative to said first member, said second member having first and second wall surfaces oriented generally perpendicular to the axis of rotation of said members and defining a thickness T therebetween, said second wall surface of said second member and an adjacent surface of said first member cooperating to define a shear space therebetween;
   (e) valve means associated with said valve plate to control the flow of fluid between said reservoir chamber and said operating chamber and temperature-responsive means associated with said valve means to effect the operation of said valve means in response to variations in a pre-determined temperature condition;
   (f) said second member defining a generally annular outer surface and said first member defining a generally annular inner surface; and
   (g) said outer surface including a first surface portion disposed adjacent said first wall surface, said first surface portion being generally cylindrical, closely spaced apart from said annular inner surface, and extending axially a distance less than about T/3, said outer surface further including a second surface portion contiguous with said first surface portion and extending to said second wall surface, said second surface portion being generally frusto-conical and cooperating with said axis of rotation to define an included angle between about 15° and about 45°.

2. A fluid coupling device as claimed in claim 1 wherein said included angle is between about 25° and about 35°.

3. A fluid coupling device as claimed in claim 1 wherein said first surface portion extends axially a distance equal to or greater than about T/5 and equal to or less than about T/4.

4. A fluid coupling device as claimed in claim 1 wherein said second wall surface of said second member and said adjacent surface of said first member cooperate to define a plurality of concentric, circumferentially-extending, interdigitated lands and grooves defining said shear space therebetween.

5. A fluid coupling device as claimed in claim 1 wherein said annular inner surface of said first member is spaced apart from said first surface portion of said second member a distance of about 0.010 inches (0.254 mm) to about 0.030 inches (0.762 mm).

6. A fluid coupling device as claimed in claim 1 wherein said second wall surface of said second member includes a plurality of radially-extending channels, each of said channels intersecting said second surface portion to facilitate evacuation of fluid from said shear space when said valve means is in a position preventing the flow of fluid from said reservoir chamber to said operating chamber.

7. A fluid coupling device as claimed in claim 6 wherein said valve plate is closely spaced apart from said first wall surface, defines a discharge orifice disposed adjacent said annular inner surface, and includes wiper means operatively disposed relative to said discharge orifice to generate a region of increased fluid pressure within said operating chamber at said discharge orifice.

8. A fluid coupling device as claimed in claim 7 wherein said second member defines a plurality of apertures, each of said apertures communicating between one of said radially-extending channels and said first wall surface of said second member to facilitate evacuation of fluid from said channels when said valve means is in a position preventing the flow of fluid from said reservoir chamber to said operating chamber.

9. A fluid coupling device comprising:
(a) a rotatable output coupling member;
(b) a cover member associated with said output coupling member to define a fluid chamber therebetween;
(c) a valve plate disposed to separate said fluid chamber into a fluid operating chamber and a fluid reservoir chamber;
(d) an input coupling member disposed in said fluid operating chamber and being rotatable relative to said output coupling member, said input coupling member having forward and rearward surfaces oriented generally perpendicular to the axis of rotation of said coupling members and defining a thickness T therebetween, said rearward surface of said input coupling member and an adjacent surface of said output coupling member cooperating to form a plurality of concentric, circumferentially-extending, interdigitated lands and grooves defining a shear space therebetween;
(e) valve means associated with said valve plate to control the flow of fluid from said reservoir chamber into said operating chamber and temperature-responsive means associated with said valve means to control the operation of said valve means in response to variations in ambient temperature external to said coupling device;
(f) said input coupling member defining a generally annular outer surface and said output coupling member defining a generally annular inner surface; and
(g) said outer surface including a generally cylindrical first surface portion disposed adjacent said forward surface, said first surface portion being closely spaced apart from said annular inner surface and having an axial width from about T/5 to about T/3, said outer surface of said input coupling member further including a second surface portion contiguous with said first surface portion and extending to said rearward surface, said second surface portion being both planar and frusto-conical and cooperating with said axis of rotation to define an included angle between about 25° and about 35°.

10. A fluid coupling device as claimed in claim 9 wherein said rearward surface of said input coupling member defines a plurality of radially-extending channels, each of said channels intersecting said second surface portion to facilitate evacuation of fluid from said shear space when said valve means is in a position closing fluid communication from said reservoir chamber to said operating chamber.

11. A fluid coupling device as claimed in claim 10 wherein said valve plate is closely spaced apart from said forward surface of said input coupling member, said valve plate defines a discharge orifice disposed adjacent said annular inner surface, and includes wiper means operatively associated with the discharge orifice to generate a region of increased fluid pressure within said operating chamber adjacent said discharge orifice.

* * * * *